United States Patent
Kitou (10) Patent No.: US 10,024,095 B2
(45) Date of Patent: Jul. 17, 2018

(54) OPENABLE AND CLOSABLE MEMBER CONTROL APPARATUS

(71) Applicant: ASMO CO., LTD., Kosai, Shizuoka-pref. (JP)

(72) Inventor: Kazuto Kitou, Kosai (JP)

(73) Assignee: ASMO CO., LTD.

( * ) Notice: Subject to any disclaimer, the term of this patent is extended or adjusted under 35 U.S.C. 154(b) by 0 days.

(21) Appl. No.: 15/409,636

(22) Filed: Jan. 19, 2017

(65) Prior Publication Data
US 2017/0218676 A1    Aug. 3, 2017

(30) Foreign Application Priority Data
Feb. 1, 2016 (JP) ................ 2016-017297

(51) Int. Cl.
*E05F 15/40* (2015.01)
*E05F 15/41* (2015.01)
*H02P 3/06* (2006.01)
*E05F 15/60* (2015.01)
*E05F 15/695* (2015.01)

(52) U.S. Cl.
CPC .............. *E05F 15/40* (2015.01); *E05F 15/41* (2015.01); *E05F 15/60* (2015.01); *E05F 15/695* (2015.01); *H02P 3/06* (2013.01)

(58) Field of Classification Search
CPC ........... E05Y 2900/55; E05Y 2201/434; E05Y 2800/252; H02H 7/0851; E05F 15/1684
USPC ........................................................ 318/283
See application file for complete search history.

(56) References Cited

U.S. PATENT DOCUMENTS

2012/0209477 A1* 8/2012 Ono ................. E05F 15/70
701/49
2014/0196252 A1* 7/2014 Sakai ................. E05F 1/002
16/71

FOREIGN PATENT DOCUMENTS

JP    2014-156767 A    8/2014

* cited by examiner

*Primary Examiner* — Kawing Chan
*Assistant Examiner* — Bradley Brown
(74) *Attorney, Agent, or Firm* — Harness, Dickey & Pierce, P.L.C.

(57) ABSTRACT

In a power window apparatus, which controls a lifting mechanism to drive a window glass from an opening position toward a closing position, a control unit is capable of executing: an automatic closing process that controls the lifting mechanism such that the lifting mechanism keeps driving the window glass until the window glass reaches the closing position; and a normal closing process that controls the lifting mechanism such that the lifting mechanism drives the window glass toward the closing position only throughout a time period of receiving a user operational input through an operation switch. The control unit executes only the normal closing process between the automatic closing process and the normal closing process when the operation switch receives the user operational input while the window glass is located within a predetermined section in a movable range of the window glass.

5 Claims, 3 Drawing Sheets

OPENABLE AND CLOSABLE MEMBER CONTROL APPARATUS

CROSS REFERENCE TO RELATED APPLICATION

This application is based on and incorporates herein by reference Japanese Patent Application No. 2016-17297 filed on Feb. 1, 2016.

TECHNICAL FIELD

The present disclosure relates to an openable and closable member control apparatus, and more particularly to an openable and closable member control apparatus that executes a control process for moving an openable and closable member toward a closing portion, at which the openable and closable member closes an opening.

BACKGROUND ART

An openable and closable member control apparatus, such as a power window apparatus, is known. This openable and closable member control apparatus opens or closes an opening by moving an openable and closable member relative to the opening. For example, this apparatus can close the opening by moving the openable and closable member to a closing portion, at which the openable and closable member closes the opening (see, for example, JP2014-156767A corresponding to US 2014/0196252A1). The movement of the openable and closable member to the closing position is executed when a user executes a closing operation (an operation for moving the openable and closable member toward the closing position) as a trigger for executing the movement of the openable and closable member to the closing position. In other words, when the closing operation is executed as a user operation, a control process for moving the openable and closable member toward the closing position is executed.

The control process for moving the openable and closable member toward the closing position includes a process (hereinafter also referred to as a normal control process), which drives the openable and closable member only throughout a time period of executing the user operation, and a process (hereinafter also referred to as an automatic control process), which keeps driving the openable and closable member until the openable and closable member reaches the closing position. The user selects one of the two control processes by executing the corresponding closing operation that corresponds to the one of the two control processes, so that the openable and closable member control apparatus executes the one of the two control processes. That is, when the user executes the closing operation to demand the execution of the automatic control process, the openable and closable member control apparatus selects and executes the automatic control process.

The selection and execution of the control process need to be performed in an appropriate manner according to an operational position of the openable and closable member. For example, in a state where the openable and closable member is located adjacent to the closing position, when the execution of the automatic control process is started, a disadvantage, such as a trouble, may possibly occur.

SUMMARY

The present disclosure is made in view of the above point, and it is an objective of the present disclosure to provide an openable and closable member control apparatus that can appropriately control movement of an openable and closable member during the movement of the openable and closable member at a location adjacent to a closing position of the openable and closable member.

In order to address the above objective, according to the present disclosure, there is provided an openable and closable member control apparatus including: a drive device that is operable to drive an openable and closable member to move the openable and closable member from an opening position, at which the openable and closable member opens an opening, toward a closing position, at which the openable and closable member closes the opening; an operational input device, through which a user inputs a user operational input for moving the openable and closable member; and a control device that controls the drive device according to the user operational input that is inputted through the operational input device, wherein: the control device is operable to execute: a first control process that controls the drive device such that the drive device keeps driving the openable and closable member until the openable and closable member reaches the closing position; and a second control process that controls the drive device such that the drive device drives the openable and closable member toward the closing position only throughout a time period of receiving the user operational input through the operational input device; and the control device executes only the second control process between the first control process and the second control process when the operational input device receives the user operational input while the openable and closable member is located within a predetermined section in a movable range of the operable and closable member.

In the openable and closable member control apparatus of the present disclosure, even when the operational input device receives the user operational input, which demands execution of the first control process (corresponding to the automatic control process described above) while the openable and closable member is located within the predetermined section, the execution of the first control process is not started. That is, the control process, which is executed in response to the input of the user operational input to the operational input device while the openable and closable member is located within the predetermined section in the movable range of the operable and closable member, is limited to the second control process. Thus, it is possible to avoid in advance occurrence of the trouble, which would occur by starting execution of the first control process while the openable and closable member is located adjacent to the closing position.

Now, a preferred construction of the openable and closable member control apparatus will be described. The openable and closable member control apparatus may include a determining device that senses a change in an operational state of the drive device and determines whether pinching of a foreign object with the openable and closable member is present based on a sensed result of the change in the operational state of the drive device. When the determining device determines that the pinching of the foreign object is present during execution of the first control process, the control device may execute a reverse control process that controls the drive device such that the drive device drives the openable and closable member toward the opening position. Execution of the reverse control process by the control device may be limited until an amount of movement of the drive device, which is measured from a time of staring an operation of the drive device, reaches a predetermined amount. The predetermined section may be set based on the closing position, and the predetermined amount.

With the above construction, the execution of the first control process is not started while the openable and closable member is located in the section, which is set in view of a time period (specifically, a time period from the time of starting the operation of the drive device until the amount of movement of the drive device reaches the predetermined amount), in which the execution of the reverse control process is impossible. In this way, the advantage of the present disclosure becomes meaningful. That is, in the previously proposed openable and closable member control apparatus, an unexecutable period, during which the reverse control process is not executable, is set. Therefore, when the first control process is started while the openable and closable member is located adjacent to the closing position, the first control process is continuously executed without executing the reverse control process. In contrast, according to the present disclosure, even when the user operational input, which demands the execution of the first control process, is inputted to the operational input device while the openable and closable member is located in the section that is set based on the period, in which the reverse control process is not executable, the execution of the first control process is not started. In this way, it is possible to avoid the movement of the openable and closable member to the closing position in the state where the foreign object is clamped with the openable and closable member.

Now, a further preferred construction of the openable and closable member control apparatus will be described. The determining of whether the pinching of the foreign object with the openable and closable member is present at the determining device may be limited when the openable and closable member is located in a determination non-executing range that is set to have the closing position as an end of the determination non-executing range in the moveable range of the openable and closable member. The predetermined section may be set based on the closing position, the determination non-executing range, and the predetermined amount.

With the above construction, the section, which is set to limit the start of the execution of the first control process while the openable and closable member is located adjacent to the closing position, is appropriately set in view of the determination non-executing range.

Now, a further preferred construction of the openable and closable member control apparatus will be described. The drive device may drive the openable and closable member that is movable to open or close the opening formed in a vehicle. When the openable and closable member is moved at a location adjacent to the closing position, the drive device may drive the openable and closable member against a frictional force that is exerted between a contacting member, which is located at an edge part of the opening, and the openable and closable member. The predetermined section may be set based on the closing position, the determination non-executing range, an end position of the contacting member in a moving direction of the openable and closable member, and the predetermined amount.

With the above construction, the section, which is set to limit the start of the execution of the first control process while the openable and closable member is located adjacent to the closing position, is appropriately set in view of the end position of the contacting member.

Now, a further preferred construction of the openable and closable member control apparatus will be described. The operational input device may be a switch, which is operable in two steps. When a portion of the switch, which is operable by the user to move the openable and closable member to the closing position, is operated to a first step position and is then further operated to a second step position, the operational input device may receive the user operational input that demands execution of the first control process.

With the above construction, even when the switch is operated in two steps (i.e., operated to the first step position and then to the second step position) while the openable and closable member is located in the predetermined section in the movable range of the openable and closable member, the execution of the first control process is not started. More specifically, even in the state where the switch is operated to the first step position while the openable and closable member is located at the outside of the predetermined section, when the switch is further operated to the second step position while the openable and closable member is located within the predetermined section, the execution of the first control process is not started. That is, even in the case where a time lag exists between the operation timing of the switch to the first step position and the operation timing of the switch to the second step position, as long as the switch is operated to the second step position while the openable and closable member is located within the predetermined section, the start of the execution of the first control process is limited. Thereby, it is possible to appropriately avoid the trouble, which would occur by starting the execution of the first control process while the openable and closable member is located adjacent to the closing position.

As discussed above, with the openable and closable member control apparatus of the present disclosure, the control process, which is executed in response to the input of the user operational input to the operational input device while the openable and closable member is located within the predetermined section in the movable range of the operable and closable member, is limited to the second control process. In this way, it is possible to avoid in advance the trouble, which would occur by starting the execution of the first control process while the openable and closable member is located adjacent to the closing position.

BRIEF DESCRIPTION OF THE DRAWINGS

The present disclosure, together with additional objectives, features and advantages thereof, will be best understood from the following description, the appended claims and the accompanying drawings in which:

DETAILED DESCRIPTION

Hereinafter, an openable and closable member control apparatus according to an embodiment of the present disclosure will be described with reference to the accompanying drawings. Here, it should be understood that the following embodiment is an example provided to ease understanding of the present disclosure, and the present disclosure should not be limited to the following embodiment. That is, the following embodiment may be further modified and/or improved within a scope of the present disclosure, and the present disclosure should cover equivalents of the following embodiment and its modifications.

Figure 1:
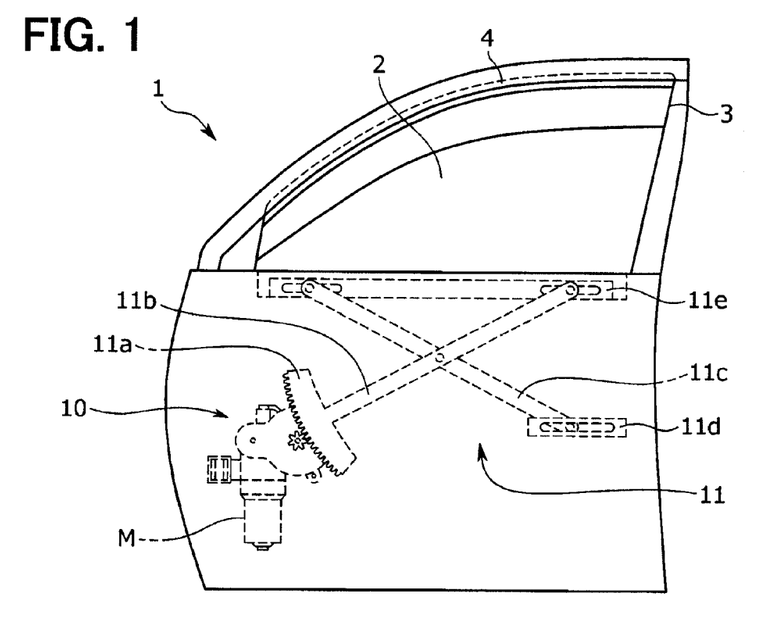
FIG. 1 is a diagram showing a mechanical structure of an openable and closable member control apparatus according to an embodiment of the present disclosure.

The openable and closable member control apparatus of the present embodiment is a power window apparatus 10, which is installed in a vehicle (e.g., an automobile) and has a mechanical structure shown in FIG. 1. FIG. 1 is a diagram indicating an example of the mechanical structure of the power window apparatus 10 of the present embodiment.

The power window apparatus 10 of the present embodiment controls opening or closing movement of a window glass 2, which serves as an openable and closable member installed in the vehicle. The window glass 2 is a constituent component of a door 1 of the vehicle. The window glass 2 is movable between a closing position, at which the window glass 2 closes an opening 3 of a generally trapezoid shape formed in the door 1, and an opening position, at which the window glass 2 opens the opening 3 of the door 1. A moving direction of the window glass 2 coincides with a top-to-bottom direction (a height direction of the vehicle). Specifically, the window glass 2 opens or closes the opening 3 through downward movement or upward movement (lowering or raising) of the window glass 2 in the opening 3. The closing position of the window glass 2 is one travel end of the window glass 2 in a closing direction (an upward direction in FIG. 1), and the opening position of the window glass 2 is the other travel end of the window glass 2 in an opening direction (a downward direction in FIG. 1).

Furthermore, as shown in FIG. 1, a contacting member 4 is placed at an upper edge part of the opening 3. The contacting member 4 forms a glass run channel and is made of a resin material that has elasticity, and two lip portions are formed at a lower end portion of the contacting member 4. When the window glass 2 is moved upward (is raised) toward the closing position, an upper end portion of the window glass 2 is clamped between the two lip portions. In this state, when the window glass 2 is moved further toward the closing position, a frictional force is generated between the window glass 2 and the contacting member 4. The window glass 2 is raised against this frictional force and finally reaches the closing position.

The power window apparatus 10 includes a lifting mechanism 11 that serves as a drive device, which drives the window glass 2 to execute opening movement or closing movement of the window glass 2. The lifting mechanism 11 includes an electric motor (hereinafter referred to as a motor) M, a lifting arm 11b, a driven-side arm 11c, a stationary channel 11d, and two glass-side channels 11e as main constituent components of the lifting mechanism 11. The motor M includes a speed reducing mechanism. The lifting arm 11b includes a gear 11a, which is shaped into a fan-shape and is driven by the motor M. The driven-side arm 11c is connected with the lifting arm 11b in a crisscross like fashion and is pivotally supported. The stationary channel 11d is fixed to the door 1. The glass-side channels 11e are provided at a lower portion of the window glass 2.

The motor M is driven by an electric power that is supplied from a control unit 13. The motor M is rotatable forward in a normal rotational direction and is also rotatable backward in a reverse rotational direction. When the motor M is rotated, the lifting arm 11b and the driven-side arm 11c are swung synchronously with the rotation of the motor M. At this time, slide movements of end portions of the lifting arm 11b and of the driven-side arm 11c are limited by the corresponding channels 11d, 11e. Specifically, the lifting arm 11b and the driven-side arm 11c are driven as an X-linkage to upwardly or downwardly move the window glass 2.

When the window glass 2 is moved through a location, which is adjacent to the closing position, the lip portions, which are formed at the lower end portion of the contacting member 4, contact the upper end portion of the window glass 2. Thereby, a frictional force is exerted between the contacting member 4 and the window glass 2. At this time, the lifting mechanism 11 drives the window glass 2 against the frictional force.

Here, the drive device, which opens or closes the window glass 2, is not limited to the lifting mechanism 11. For example, the drive device may be a drive device of a wire and pulley type that opens or closes the window glass 2 through a wire and a pulley. More specifically, an endless wire is wound around a main drive pulley, which is coupled to an output shaft of the motor M, and a driven-side pulley, which is supported by the door 1. In a state where a portion of the endless wire is attached to the lower end portion of the window glass 2, when the main drive pulley is rotated to rotate the endless wire, the window glass 2 is driven through the endless wire.

Figure 2:
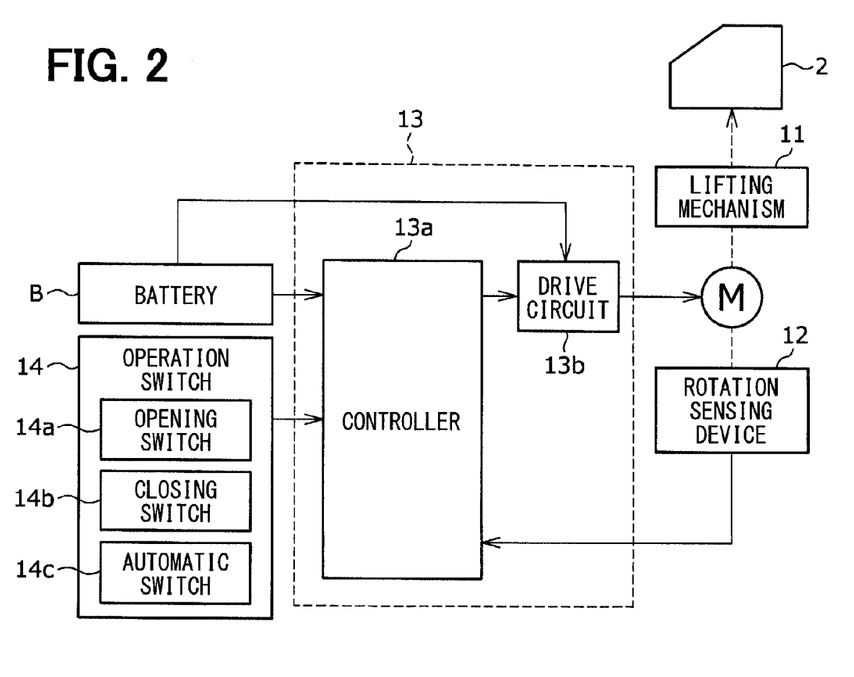
FIG. 2 is a diagram showing a control system of the openable and closable member control apparatus according to the embodiment of the present disclosure.

Next, a control system of the power window apparatus 10 will be described. As shown in FIG. 2, a rotation sensing device 12, the control unit 13 and an operation switch 14 are provided as main constituent components of the control system of the power window apparatus 10. FIG. 2 shows an example of the control system of the power window apparatus 10 of the present embodiment.

The rotation sensing device 12 includes Hall elements (e.g., a Hall IC including, for example, two Hall elements) and is formed integrally with the motor M. The rotation sensing device 12 outputs a pulse signal (a speed measurement signal or a rotational speed signal), which is synchronized with rotation of the motor M. The pulse signal is outputted every time the window glass 2 is moved for a predetermined distance or every time the motor M is rotated for a predetermined angle. Specifically, the rotation sensing device 12 outputs the signals that correspond to the rotational speed of the motor M.

The control unit 13 serves as a control device that controls the lifting mechanism 11, more precisely the motor M. As shown in FIG. 2, this control unit 13 includes a controller 13a and a drive circuit 13b. The controller 13a includes an electronic control unit (ECU) and changes between turning on and turning off of supply of the electric power from a battery B to the motor M and also changes a flow direction of the electric current, which flows through the motor M at the time of turning on of the supply of the electric power to the motor M. The drive circuit 13b includes relays, which change a power supply state from the battery B to the motor M and also change the flow direction of the electric current in the motor M.

When the controller 13a switches the relays in the drive circuit 13b, the turning on and off of the motor M and the rotational direction of the motor M are controlled. When the above-described control process is executed, the lifting mechanism 11 is operated to drive the window glass 2 and thereby to execute the opening movement or the closing movement of the window glass 2. Details of the control unit 13 will be described later.

The operation switch 14 functions as an operational input device, through which a user inputs a user operational input (i.e., an input of a user) for executing the opening or closing movement of the window glass 2. Specifically, the user (more specifically, an occupant of the vehicle) operates the operation switch 14 at the time of moving the window glass 2 to a desired operational position. When the operation switch 14 receives the user operational input through a corresponding operation of the operation switch 14, the operation switch 14 generates a command signal, which corresponds to the corresponding operation of the operation switch 14 executed by the user, and the operation switch 14 outputs the generated command signal to the control unit 13.

Furthermore, in the present embodiment, the operation switch 14 is a two-step rocker switch, which is operable in two steps (operable to a first step position and a second step position). The operation switch 14 includes an opening switch 14a, a closing switch 14b and an automatic switch 14c. Specifically, when one end portion of the operation switch 14 (a portion of the operation switch 14 that is operable by the user to move the window glass 2 to the opening position) is operated and is thereby positioned to a first step position of the one end portion of the operation switch 14, the opening switch 14a is turned on. Thereby, the operation switch 14 outputs a normal opening signal, which is a signal for executing a normal opening operation of the window glass 2 (an operation that downwardly moves the window glass 2 only throughout a time period of receiving a corresponding user operational input through the operation switch 14).

When the one end portion of the operation switch 14 is further operated and is thereby positioned to a second step position of the one end portion of the operation switch 14 after the one end portion of the operation switch 14 is operated and is positioned to the first step position, both of the opening switch 14a and the automatic switch 14c are turned on. In this way, the operation switch 14 outputs an automatic opening signal, which is a signal for executing an automatic opening operation of the window glass 2 (an operation that maintains the downward movement of the window glass 2 until the window glass 2 reaches the opening position even if the user stops the operation of the operation switch 14).

When the other end portion of the operation switch 14 (a portion of the operation switch 14 that is operable by the user to move the window glass 2 to the closing position) is operated and is thereby positioned to a first step position of the other end portion of the operation switch 14, the closing switch 14b is turned on. Thereby, the operation switch 14 outputs a normal closing signal, which is a signal for executing a normal closing operation of the window glass 2 (an operation that upwardly moves the window glass 2 only throughout a time period of receiving a corresponding user operational input through the operation switch 14). When the other end portion of the operation switch 14 is further operated and is thereby positioned to a second step position after the other end portion of the operation switch 14 is operated and is positioned to the first step position, both of the closing switch 14b and the automatic switch 14c are turned on. In this way, the operation switch 14 outputs an automatic closing signal, which is a signal for executing an automatic closing operation of the window glass 2 (an operation that maintains the upward movement of the window glass 2 until the window glass 2 reaches the closing position even if the user stops the switch operation).

When the control unit 13 receives the command signal, which is outputted from the operation switch 14, the control unit 13 executes the corresponding control process described above according to the received command signal. Specifically, when the control unit 13 receives the normal opening signal from the operation switch 14, the control unit 13 controls the motor M such that the motor M downwardly drives the window glass 2 throughout the time period of receiving the corresponding user operational input through the operation switch 14. Furthermore, when the control unit 13 receives the automatic opening signal from the operation switch 14, the control unit 13 controls the motor M such that the downward movement of the window glass 2 is maintained until the window glass 2 reaches the opening position.

Furthermore, when the control unit 13 receives the automatic closing signal from the operation switch 14, the control unit 13 controls the motor M such that the upward movement of the window glass 2 is maintained until the window glass 2 reaches the closing position. This control process corresponds to a first control process and will be hereinafter referred to as an automatic closing process. Furthermore, when the control unit 13 receives the normal closing signal from the operation switch 14, the control unit 13 controls the motor M such that the motor M upwardly drives the window glass 2 only throughout the time period of receiving the corresponding operational input through the operation switch 14. This control process corresponds to a second control process and will be hereinafter referred to as a normal closing process.

Here, it should be noted that when the other end portion of the operation switch 14 is operated and is thereby positioned to the second step position, the operation switch 14 receives the user operational input that demands the execution of the automatic closing process. However, at this time, when the other end portion of the operation switch 14 is positioned to the first step position before the second step position, the closing switch 14b is first turned on. Thereafter, when the other end portion of the operation switch 14 is positioned to the second step position after elapse of the time from the time of positioning the other end portion of the operation switch 14 to the first step position, the automatic switch 14c is turned on. Thus, when the operation switch 14 receives the user operational input that demands the execution of the automatic closing process, the operation switch 14 first outputs the normal closing signal and thereafter outputs the automatic closing signal.

In the present embodiment, besides the function of executing the control processes described above, the control unit 13 also has the following functions (1) to (3).

(1) A function of identifying an operational state of the motor M (a state identifying function)

(2) A function of determining whether pinching of a foreign object with the window glass 2 is present (a determining function)

(3) A function of limiting start of execution of the automatic closing process (a control process limiting function)

Hereinafter, these three functions will be described.

(1) With Respect to the State Identifying Function

In the present embodiment, the control unit 13 identifies (determines) the operational state of the motor M, specifically, a rotational speed of the motor M. Specifically, when the pulse signal, which is outputted from the rotation sensing device 12 (more specifically the pulse signal outputted from one of the Hall elements of the rotation sensing device 12), is inputted to the control unit 13, the control unit 13 computes the rotational speed of the motor M based on an input interval of the pulse signals inputted to the control unit 13. More specifically, the control unit 13 identifies a waveform of the inputted pulse signal and senses a leading edge or a trailing edge of the waveform, i.e., senses a pulse edge. Then, the control unit 13 computes the rotational speed of the motor M based on the interval of the pulse edges. At this time, the control unit 13 obtains the rotational direction of the motor M based on a phase difference between the pulse signals outputted from the Hall elements, respectively, of the rotation sensing device 12. The control unit 13 identifies the moving direction of the window glass 2 based on the obtained rotational direction of the motor M.

Furthermore, the control unit 13 counts the pulse edges of the inputted pulse signals to compute a current operational position of the window glass 2. Specifically, a pulse edge count number (i.e., a count number of the pulse edge(s)) at a reference position (e.g., the closing position) in the moving direction of the window glass 2 is set to 0 (zero). Furthermore, the control unit 13 (more specifically an undepicted memory device of the control unit 13) stores data that indicates a relationship between the pulse edge count number and a distance measured from the reference position. Every time when the pulse edge count number is increased or decreased synchronously with the rotation of the motor M, the control unit 13 identifies the position of the window glass 2, which corresponds to the current count number, based on the above-described relationship, i.e., identifies the current position of the window glass 2 (more specifically, the distance from the reference position).

(2) With Respect to the Determining Function

In the present embodiment, the control unit 13 functions as a determining device and determines whether pinching of a foreign object with the window glass 2 in the moving state is present. Specifically, when the rotational speed of the motor M, which is identified through the state identifying function of the control unit 13, is changed, the control unit 13 senses this change and determines whether the pinching of the foreign object with the window glass 2 is present based on this sensed result (the change in the rotational speed of the motor M). Hereinafter, a procedure of determining whether the pinching of the foreign object is present will be described.

When the pinching of the foreign object with the window glass 2 occurs, the rotational speed of the motor M is reduced. The control unit 13 monitors the rotational speed of the motor M, which is currently rotated, based on the pulse signal inputted to the control unit 13 from the rotation sensing device 12 during a time period of moving the window glass 2 toward the closing position. When the rotational speed of the motor M begins to decrease during the movement of the window glass 2 toward the closing position, the control unit 13 senses start of the pinching of the foreign object with the window glass 2 at this moment. Thereafter, the control unit 13 computes the amount of change (rate of change) in the rotational speed of the motor M. When this computed result exceeds a pinching determination threshold value, the control unit 13 determines that the pinching of the foreign object with the window glass 2 is present. The pinching determination threshold value is stored in the undepicted memory device of the controller 13a.

Furthermore, in the present embodiment, when the control unit 13 determines that the pinching of the foreign object with the window glass 2 is present during the automatic closing movement of the window glass 2 (i.e., the time of executing the automatic closing process), the control unit 13 stops the motor M to interrupt the movement of the window glass 2 and thereafter executes a reverse control process. The reverse control process is a process that is executed to release the pinched object by moving the window glass 2 in an opposite direction, which is opposite from the moving direction of the window glass 2 immediately before the time of stopping the motor M. In other words, in the reverse control process, the motor M is controlled such that the window glass 2, which was previously moved toward the closing position before the time of stopping the motor M, is moved toward the opening position (by changing the flow direction of the electric current in the motor M).

In the present embodiment, in the movable range of the window glass 2, a range, which is from a position located a little bit before the closing position to the closing position, is set as a determination non-executing range. The determination non-executing range is an insensitive range that has an end position at the closing position. When the window glass 2 is located within the determination non-executing range, the determination of whether the pinching of the foreign object is present is limited (disabled). The reason for setting the determination non-executing range is as follows. That is, when the window glass 2 is placed at a location adjacent to the closing position, a slide resistance, which is applied from the contacting member 4 to the window glass 2, is increased to cause a reduction in the rotational speed of the motor M. In order to limit the erroneous determination of the presence of the pinching of the foreign object with the window glass 2 upon sensing of this reduction in the rotational speed of the motor M, the determination non-executing range is set.

The determination non-executing range is set as an extent that corresponds to a corresponding pulse signal number (more specifically, a corresponding pulse edge count number), which is several tens. However, a specific value of this pulse signal number (a specific pulse signal number) may vary depending on a type of a vehicle, in which the power window apparatus 10 is installed, and/or a type of a door of the vehicle.

Furthermore, in the present embodiment, a start time mask is set in view of a fact of that the rotational speed of the motor M is unstable for a while from the time of starting the motor M. The start time mask is a period that is set to avoid the erroneous determination of the pinching. That is, even when the amount of change (rate of change) in the rotational speed of the motor M becomes equal to or larger than the threshold value, the control unit 13 does not determine the presence of the pinching of the foreign object with the window glass 2 during the period, which starts at the time of starting the execution of the automatic closing process and corresponds to the period of the start time mask. In this way, the execution of the reverse control process is limited.

The period of the start time mask is set to be a period that is from the time point of starting the rotation of the motor M caused by the start of the execution of the automatic closing process to a time point, at which the amount of rotation of the motor M (the amount of movement of the motor M) reaches a predetermined amount. Specifically, a corresponding pulse signal number (more specifically, a corresponding pulse edge count number), at which the rotational speed of the motor M becomes unstable, is repeatedly measured. Then, a maximum pulse signal number among these measured pulse signal numbers is specified, and several pulses are added to this maximum pulse signal number, and a section, an extent of which corresponds to the sum of the maximum pulse signal number and the several additional pulses, is set as the start time mask.

The extent of the section (the pulse signal number), which is set as the start time mask, changes depending on the amount of movement of the window glass 2 relative to the motor M. More specifically, the extent of the start time mask changes depending on, for example, a structure and a type of the drive device, which drives the window glass 2, a speed reducing ratio of the motor M itself, the number of Hall elements installed to the motor M and the number of sensor magnets (the number of magnetic poles of the sensor magnets) installed to the motor M.

Figure 3:
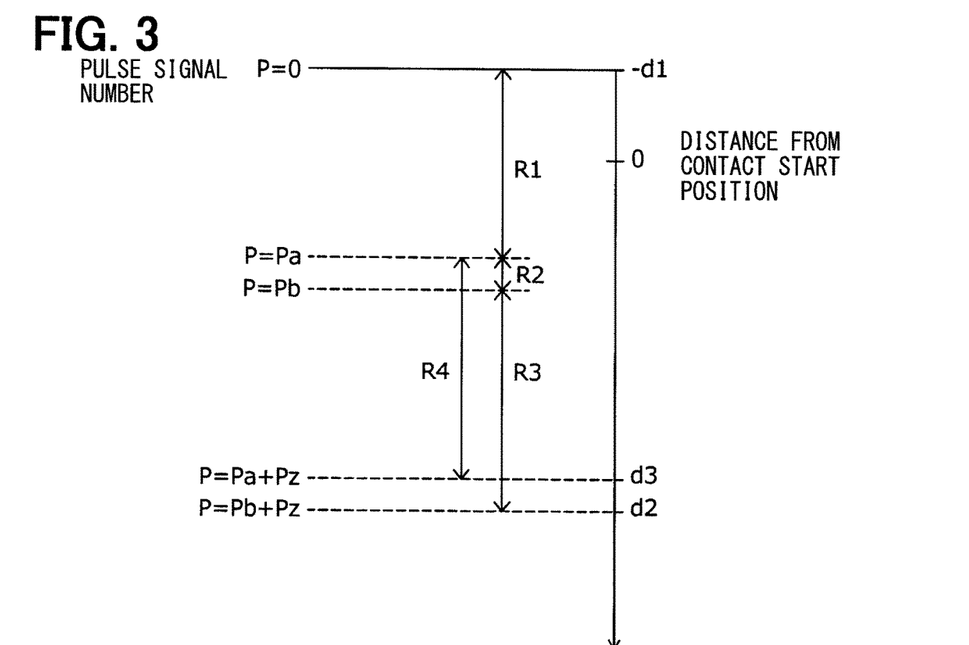
FIG. 3 is a diagram showing a relationship between each of set positions and a corresponding pulse signal number in a movable range of an openable and closable member.

A positional relationship of each of the determination non-executing range and the start time mask in the movable range of the window glass 2 will be described with reference to FIG. 3. FIG. 3 is a diagram indicating a relationship between each of set positions and a corresponding pulse signal number in the movable range of the window glass 2. In FIG. 3, a distance, which is measured from a position (indicated as a contact start position in FIG. 3) where the window glass 2 and the contacting member 4 start to contact with each other, is indicated for each of the set positions. In FIG. 3, with respect to the closing position, the distance, which is measured from the contact start position to the closing position, is "−d1", and the pulse signal number P, which corresponds to the closing position, is 0 (zero).

The determination non-executing range is a range indicated by a reference sign R1 in FIG. 3. Furthermore, as shown in FIG. 3, the determination non-executing range has an extent where a corresponding pulse signal number P is set to be from 0 to Pa (where Pa>0). Furthermore, in FIG. 3, a range, which is indicated by a reference sign R2, is a section (hereinafter referred to as a required section), which needs to be ensured in order to execute the reverse control process. An extent of the required section is an extent of several pulses. Specifically, the pulse signal number P, which corresponds to the extent of the required section discussed above, is set to be from Pa to Pb (where Pb>Pa).

In FIG. 3, the start time mask is a range, which is indicated by a reference sign R3, or a range, which is indicated by a reference sign R4. The pulse signal number P, which corresponds to the start time mask, is the section (indicated by a reference sign Pz in FIG. 3), an extent of which is a sum of the maximum pulse signal number and the several additional pulses, and this maximum pulse signal number is the maximum one among the measured pulse signal numbers, at each of which the rotational speed of the motor M becomes unstable, as noted above.

As shown in FIG. 3, a section (hereinafter referred to as a first assumed section), which is a sum of the determination non-executing range R1, the required section R2 and the start time mask R3, has an extent where the pulse signal number is from 0 to Pb+Pz. An upper end position of the first assumed section is the closing position, and a lower end position of the first assumed section is a position that is downwardly spaced from the contact start position by a distance d2.

Alternatively, a section (hereinafter referred to as a second assumed section), which is a sum of the determination non-executing range R1 and the start time mask R4, has an extent where the pulse signal number is from 0 to Pa+Pz. An upper end position of the second assumed section is the closing position, and a lower end position of the second assumed section is a position that is downwardly spaced from the contact start position by a distance d3 (where d3<d2).

As is understood from the positional relationships described above, in the case where the presence of the pinching of the foreign object is determined during the time of executing the automatic closing process, in order to release the pinched object in an appropriate manner by executing the reverse control process, the window glass 2 needs to be located on the lower side of the first assumed section. Specifically, in order to normally execute the reverse control process, the upper end of the window glass 2 needs to be located on the lower side of the lower end position of the first assumed section (the position that is downwardly spaced from the contact start position by the distance d2).

In contrast, in a case where the presence of the pinched foreign object is determined in a state where the upper end of the window glass 2 is located on the upper side (the closing position side) of the lower end position of the first assumed section during the time of executing the automatic closing process, when execution of a foreign object control process (i.e., the reverse control process for releasing the pinched foreign object) is started, the upper end of the window glass 2 is placed in the determination non-executing range R1 before the time of completing the reverse control process. In this case, the motor M is stopped before the time of completing the execution of the reverse control process, and thereby the reverse control process is interrupted, thereby having a state known as a lock/reverse rotation state.

Furthermore, in a case where the presence of the pinched foreign object is determined in a state where the upper end of the window glass 2 is located on the upper side (the closing position side) of the lower end position of the second assumed section during the time of executing the automatic closing process, the motor M is stopped without execution of the foreign object control process, thereby having state known as a lock/stop state.

In the case of the above-described construction where the determination non-executing range and the start time mask are set in the above-described manner, and the reverse control process is executed in the case where the presence of the pinched foreign object is determined during the time of executing the automatic closing process, the above-described disadvantage inevitably occurs. Specifically, when the lock/reverse rotation state or the lock/stop state occurs in the case where the execution of the automatic closing process is started while the window glass 2 is located adjacent the closing position, a trouble, which is caused by the lock/reverse rotation state or the lock/stop state, may possibly occur.

In view of the above point, in the power window apparatus 10 of the present embodiment, the control unit 13 has a control process limiting function to avoid the occurrence of the trouble in advance through use of the control process limiting function. Hereinafter, details of the control process limiting function will be described.

(3) With Respect to the Control Process Limiting Function

In the present embodiment, when the window glass 2 is located adjacent to the closing position, the control unit 13 limits the selection of the automatic closing process and the start of the execution of the automatic closing process. Specifically, according to the present embodiment, the control unit 13 executes only the normal closing process between the automatic closing process and the normal closing process when the operation switch 14 receives the user operational input while the window glass 2 is located within a predetermined section (hereinafter referred to as a specific section) in the movable range of the window glass 2.

Figure 4:
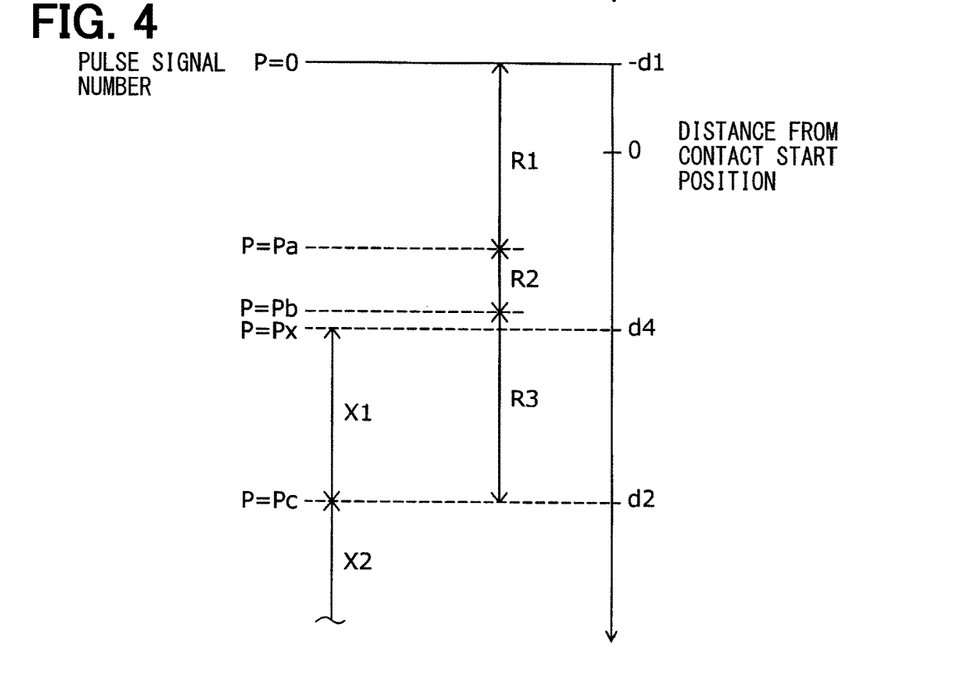
FIG. 4 is a diagram showing a position of a specific section in the movable range of the openable and closable member according to the embodiment.

The specific section discussed above will be described in detail. The specific section is a section that is set adjacent to the closing position. The specific section is set based on the determination non-executing range, the lower end position of the contacting member 4 and the start time mask besides the closing position. Hereinafter, an extent of the specific section will be described with reference to FIG. 4. FIG. 4 is a diagram showing a position of the specific section in the movable range of the window glass 2. FIG. 4 corresponds to FIG. 3, and similar to FIG. 3, FIG. 4 indicates the relationship between each of the set positions and the corresponding pulse signal number in the movable range of the window glass 2. FIG. 4 also indicates a distance of each of the set positions measured from the contact start position.

The determination non-executing range R1 is set in a range that is from a position, which is a little bit before the closing position (i.e., slightly downwardly spaced from the closing position), to the closing position in the movable range of the window glass 2. As discussed above, the determination non-executing range R1 is set as the extent that corresponds to the corresponding pulse signal number, which is several tens. The pulse signal number P of this extent is from 0 to Pa. At the section (i.e., the first assumed section), which is the sum of the determination non-executing range R1, the required section R2 and the start time mask R3, the corresponding pulse signal number P is set to be from 0 to Pc (where Pc=Pb+Pz).

Furthermore, the lower end position of the contacting member 4 is downwardly spaced from the contact start position by the distance d4 in the movable range of the window glass 2. The pulse signal number P, which corresponds to the lower end position of the contacting member 4, is Px (where Pb<Px<Pc), as shown in FIG. 4.

In the present embodiment, the upper end position of the specific section (the section indicated by a reference sign X1 in FIG. 4) is set to coincide with the lower end position of the contacting member 4, and the lower end position of the specific section is set to coincide with the lower end position of the first assumed section. In other words, the specific section X1 is set as an extent where the pulse signal number P is from Px to Pc. The setting method of the specific section X1 should not be limited to the above-described one, and the specific extent of the specific section X1 may be freely set. Furthermore, the number of location(s) of the specific section X1 in the movable range of the window glass 2 should not be limited to the one. That is, a plurality of specific sections may be formed in the movable range of the window glass 2.

When the operation switch 14 receives the user operational input for executing the automatic closing process in the state where the window glass 2 is located in the specific section X1, which is set in the above-described manner, the control unit 13 stops the motor M without executing the automatic closing process. In contrast, when the operation switch 14 receives the user operational input for executing the normal closing control process in the state where the window glass 2 is located in the specific section X1, the control unit 13 starts the execution of the normal closing control process according to the user operational input for executing the normal closing control process. As discussed above, according to the present embodiment, only the execution of the normal closing process can be started in the period, in which the window glass 2 is placed adjacent to the closing position. Thereby, it is possible to avoid the trouble that results from the occurrence of the lock/reverse rotation state or the lock/stop state in the case where the execution of the automatic closing process is started while the window glass 2 is located adjacent to the closing position.

Here, it should be noted that a non-specific section (a section indicated by a reference sign X2 in FIG. 4) is set at a location immediately below the specific section in the movable range of the window glass 2. When the operation switch 14 receives the user operational input for executing the automatic closing process in the state where the window glass 2 is located in the non-specific section X2 (more specifically, in the state where an extent of the window glass 2 from the upper end to the lower end of the window glass 2 is within the non-specific section X2), the control unit 13 starts the execution of the automatic closing process. The non-specific section X2 is the extent, in which the start of the execution of the automatic closing process is permitted.

Figure 5:
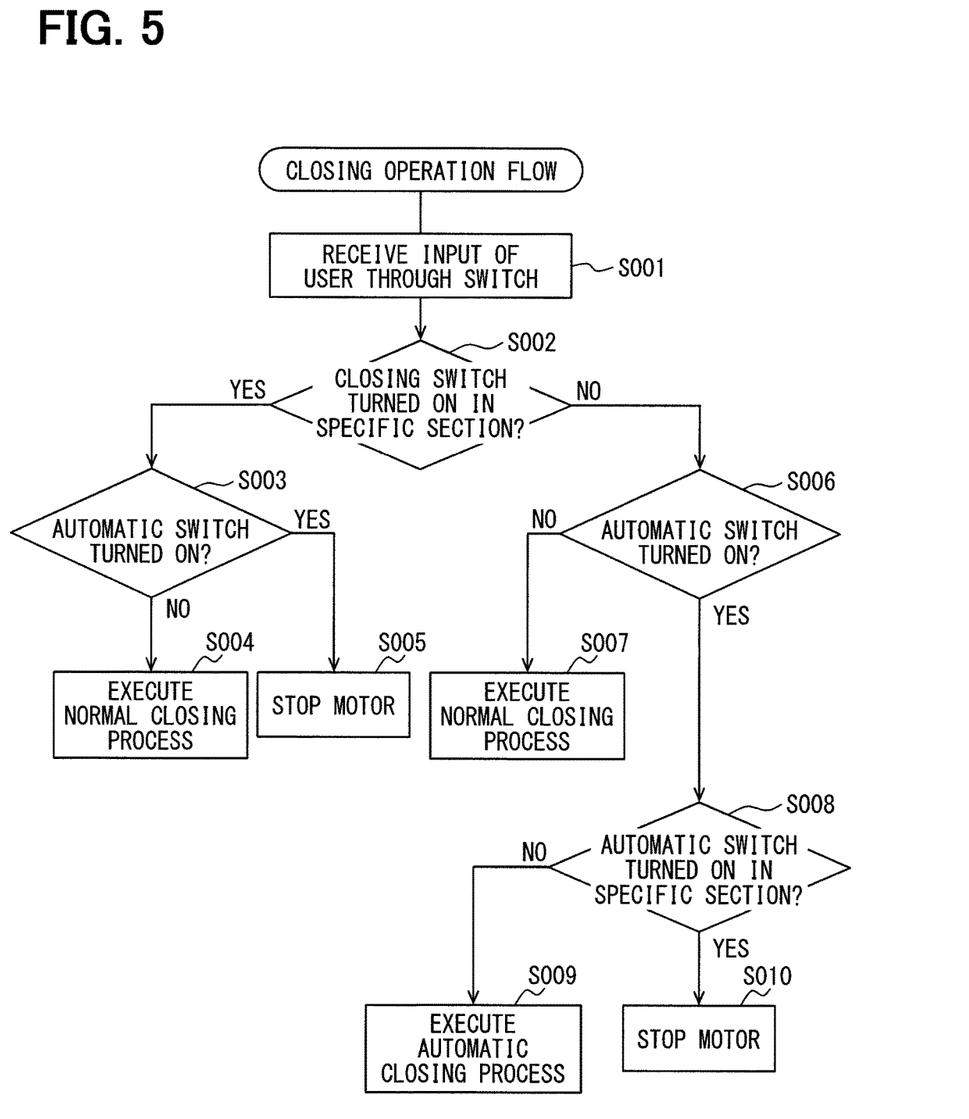
FIG. 5 is a diagram indicating a closing operation flow according to the embodiment.

Hereinafter, in order to more specifically describe the control process limiting function, a flow (a closing operation flow) for executing the closing operation of the window glass 2 will be described with reference to FIG. 5. FIG. 5 is a diagram showing the closing operation flow.

The closing operation flow starts at step S001 when the operation switch 14 receives the user operational input for executing the closing operation of the window glass 2, i.e., when the other end portion of the operation switch 14 is pressed by the user. In this way, the closing switch 14b of the operation switch 14 is turned on, and thereby the corresponding command signal is outputted from the operation switch 14 to the control unit 13.

When the control unit 13 receives the command signal, the control unit 13 identifies the current position of the window glass 2 and determines whether the closing switch 14b is turned on while the window glass 2 is located within the specific section at step S002. When it is determined that the closing switch 14b is turned on while the window glass 2 is located within the specific section at step S002 (i.e., YES at step S002), the operation proceeds to step S003. At step S003, the control unit 13 determines whether the automatic switch 14c is turned on together with the closing switch 14b. When it is determined that only the closing switch 14b is turned on at step S003 (i.e., NO at step S003), the control unit 13 proceeds to step S004. At step S004, the control unit 13 starts the execution of the normal closing process by controlling the motor M such that the motor M is driven to raise the window glass 2 only throughout the time period of turning on of the closing switch 14b (i.e., the time period of receiving the user operational input through the closing switch 14b).

In contrast, when it is determined that both of the closing switch 14b and the automatic switch 14c are turned on at step S003 (i.e., YES at step S003), the control unit 13 proceeds to step S005. At step S005, the control unit 13 stops the motor M without starting the execution of the automatic closing process through use of the control process limiting function.

When it is determined that the closing switch 14b is turned on while the window glass 2 is located at the outside of the specific section at step S002 (i.e., NO at step S002), the control unit 13 proceeds to step S006. At step S006, the control unit 13 determines whether the automatic switch 14c is additionally turned on within a predetermined period after it is determined that the closing switch 14b is turned on while the window glass 2 is located at the outside of the specific section at step S002. When it is determined that only the closing switch 14b is turned on at step S006 (i.e., NO at step S006), the control unit 13 proceeds to step S007. At step S007, the control unit 13 controls the motor M such that the motor M is driven to raise the window glass 2 only throughout the time period of turning on of the closing switch 14b.

In contrast, when it is determined that both of the closing switch 14b and the automatic switch 14c are turned on at step S006 (i.e., YES at step S006), the control unit 13 proceeds to step S800. At step S800, the control unit 13 determines whether the time of turning on the automatic switch 14c is within the period, in which the window glass 2 is located within the specific section. When it is determined that the automatic switch 14c is turned on while the window glass 2 is located at the outside of the specific section at step S008 (i.e., NO at step S008), the control unit 13 proceeds to step S009. At step S009, the control unit 13 starts the execution of the automatic closing process and controls the motor M such that the motor M is driven to keep raising the window glass 2 until the window glass 2 reaches the closing position.

In contrast, when it is determined that the automatic switch 14c is turned on while the window glass 2 is located within the specific section at step S008 (i.e., YES at step S008), the control unit 13 proceeds to step S010. At step S010, the control unit 13 stops the motor M without starting the execution of the automatic closing process.

As discussed above, according to the present embodiment, when the automatic switch 14c is turned on while the window glass 2 is located within the specific section, the start of the execution of the automatic closing process is limited by the control process limiting function. Therefore, in the case where the other end portion of the operation switch 14 is operated to the second step position as the operation of demanding the automatic closing process after the operation of the other end portion of the operation switch 14 to the first step position, even when the other end portion of the operation switch 14 is previously operated to the first step position while the window glass 2 is present at the outside of the specific section, the start of the execution of the automatic closing process is limited by the control process limiting function as long as the other end portion of the operation switch 14 is operated to the second step position while the window glass 2 is located within the specific section. Thereby, it is possible to avoid in advance the occurrence of the trouble, which is caused by the start of the execution of the automatic closing process upon operation of the other end portion of the operation switch 14 to the second step position while the window glass 2 is located adjacent to the closing position.

In the above description, the power window apparatus 10 of the present embodiment has been described. Here, it should be noted that the above description of the embodiment is a mere example of the construction of the openable and closable member control apparatus of the present disclosure, and other constructions are also conceivable. For example, in the above embodiment, the change in the rotational speed of the motor M is sensed, and it is determined whether the pinching of the object with the window glass 2 is present based on the result of the sensing of the change in the rotational speed of the motor M. The present disclosure should not be limited to this construction. For example, a change in an operation state (e.g., a change in the rotational torque), which is other than the rotational speed, may be sensed, and it may be determined whether the pinching of the object with the window glass 2 is present based on the result of sensing of the change in this operational state.

Furthermore, in the above embodiment, the extent, which is set as the specific section X1, is fixed. However, the present disclosure should not be limited to this. For example, the specific section X1 may be changeable, and the extent of the specific section X1 may be appropriately reconsidered in view of aging of each corresponding component of the power window apparatus 10 after the setting of the extent of the specific section X1.

Furthermore, in the above embodiment, the power window apparatus 10, which controls the opening or closing movement of the window glass 2 of the vehicle, is used as the example. However, the present disclosure should not be limited to this. Specifically, the present disclosure may be applied to an apparatus, which controls opening or closing movement of a window glass installed in a vehicle that is other than the automobile, an apparatus, which controls opening or closing movement of a slide door installed in a side portion of the vehicle (e.g., the automobile), an apparatus, which controls opening or closing movement of a sunroof panel installed in an upper portion of the vehicle (e.g., the automobile), or an apparatus, which controls opening or closing movement of another type of openable and closable member, which is installed to a vehicle (e.g., the automobile).

What is claimed is:

1. An openable and closable member control apparatus comprising:
   a drive device that is operable to drive an openable and closable member to move the openable and closable member from an opening position, at which the openable and closable member opens an opening, toward a closing position, at which the openable and closable member closes the opening;
   an operational input device, through which a user inputs a user operational input for moving the openable and closable member; and
   a control device that controls the drive device according to the user operational input that is inputted through the operational input device, wherein:
   the control device is operable to execute:
      a first control process that controls the drive device such that the drive device keeps driving the openable and closable member until the openable and closable member reaches the closing position; and
      a second control process that controls the drive device such that the drive device drives the openable and closable member toward the closing position only throughout a time period of receiving the user operational input through the operational input device; and
   the control device executes only the second control process between the first control process and the second control process when the operational input device receives the user operational input while the openable and closable member is located within a predetermined section in a movable range of the operable and closable member.

2. The openable and closable member control apparatus according to claim 1, comprising a determining device that senses a change in an operational state of the drive device and determines whether pinching of a foreign object with the openable and closable member is present based on a sensed result of the change in the operational state of the drive device, wherein:
   when the determining device determines that the pinching of the foreign object is present during execution of the first control process, the control device executes a reverse control process that controls the drive device such that the drive device drives the openable and closable member toward the opening position;
   execution of the reverse control process by the control device is limited until an amount of movement of the drive device, which is measured from a time of staring an operation of the drive device, reaches a predetermined amount; and
   the predetermined section is set based on the closing position, and the predetermined amount.

3. The openable and closable member control apparatus according to claim 2, wherein:
   the determining of whether the pinching of the foreign object with the openable and closable member is present at the determining device is limited when the openable and closable member is located in a determination non-executing range that is set to have the closing position as an end of the determination non-executing range in the moveable range of the openable and closable member; and the predetermined section is set based on the closing position, the determination non-executing range, and the predetermined amount.

4. The openable and closable member control apparatus according to claim 3, wherein:

the drive device drives the openable and closable member that is movable to open or close the opening formed in a vehicle;

when the openable and closable member is moved at a location adjacent to the closing position, the drive device drives the openable and closable member against a frictional force that is exerted between a contacting member, which is located at an edge part of the opening, and the openable and closable member; and the predetermined section is set based on the closing position, the determination non-executing range, an end position of the contacting member in a moving direction of the openable and closable member, and the predetermined amount.

5. The openable and closable member control apparatus according to claim 1, wherein:

the operational input device is a switch, which is operable in two steps; and when a portion of the switch, which is operable by the user to move the openable and closable member to the closing position, is operated to a first step position and is then further operated to a second step position, the operational input device receives the user operational input that demands execution of the first control process.

* * * * *

UNITED STATES PATENT AND TRADEMARK OFFICE
CERTIFICATE OF CORRECTION

PATENT NO. : 10,024,095 B2
APPLICATION NO. : 15/409636
DATED : July 17, 2018
INVENTOR(S) : Kitou Page 1 of 1

It is certified that error appears in the above-identified patent and that said Letters Patent is hereby corrected as shown below:

On the Title Page

Column 1, (71) Applicant: delete "ASMO CO., LTD, Kosai, Shizuoka-pref. (JP)" and insert
-- DENSO CORPORATION, Kariya-city, Aichi-pref. (JP) --

Column 1, (73) Assignee: delete "ASMO CO., LTD" and insert -- DENSO CORPORATION --

Signed and Sealed this
Twenty-third Day of October, 2018

Andrei Iancu
*Director of the United States Patent and Trademark Office*